United States Patent
Dai et al.

(10) Patent No.: US 11,333,787 B2
(45) Date of Patent: May 17, 2022

(54) ELECTROMAGNETIC INSULATING COMPONENT USED IN WELL LOGGING TOOL PAD

(71) Applicant: Halliburton Energy Services, Inc., Houston, TX (US)

(72) Inventors: Junwen Dai, Singapore (SG); Burkay Donderici, Houston, TX (US); David Ronald Beard, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 285 days.

(21) Appl. No.: 16/613,783

(22) PCT Filed: Dec. 28, 2018

(86) PCT No.: PCT/US2018/067817
§ 371 (c)(1),
(2) Date: Nov. 14, 2019

(87) PCT Pub. No.: WO2020/139363
PCT Pub. Date: Jul. 2, 2020

(65) Prior Publication Data
US 2021/0048551 A1 Feb. 18, 2021

(51) Int. Cl.
*G01V 3/00* (2006.01)
*G01V 3/20* (2006.01)
(Continued)

(52) U.S. Cl.
CPC ............ *G01V 3/20* (2013.01); *E21B 47/0025* (2020.05); *E21B 49/005* (2013.01); *G01V 3/26* (2013.01); *G01V 3/30* (2013.01); *E21B 47/00* (2013.01)

(58) Field of Classification Search
CPC ... G01V 3/24; G01V 3/20; G01V 3/26; G01V 3/28; G01V 3/18; G01V 3/38; G01V 3/00;
(Continued)

(56) References Cited

U.S. PATENT DOCUMENTS 3,060,373 A   10/1962   Doll
3,132,298 A   5/1964    Doll et al.
(Continued)

FOREIGN PATENT DOCUMENTS

| | | |
|---|---|---|
| CA | 685727 | 5/1964 |
| WO | 2019177588 | 9/2019 |

OTHER PUBLICATIONS

ISRWO International Search Report and Written Opinion for PCT/US2018/067817 dated Sep. 25, 2019.
(Continued)

*Primary Examiner* — Raul J Rios Russo
(74) *Attorney, Agent, or Firm* — John Wustenberg; C. Tumey Law Group PLLC

(57) ABSTRACT

A downhole tool, comprising: a tool mandrel; a pad comprising a transmitter operable to transmit an electric current into a formation and a receiver operable to receive at least a portion of the electric current from transmitter; an extension from the tool mandrel that couples pad to tool mandrel; and a signal filter positioned in the downhole tool to suppress passage of mandrel leakage current that passes through tool mandrel to pad. A method of resistivity imaging, comprising: disposing a downhole tool into borehole; transmitting a current into formation surrounding the borehole with a transmitter that is extended from tool mandrel of the downhole tool towards borehole wall; and recording at least a portion of the current that returns to receiver of downhole tool, wherein a signal filter suppress passages of mandrel
(Continued)

leakage current that passes through the tool mandrel to a pad on which the transmitter is disposed.

20 Claims, 7 Drawing Sheets

(51) Int. Cl.
*E21B 47/002* (2012.01)
*E21B 49/00* (2006.01)
*G01V 3/30* (2006.01)
*G01V 3/26* (2006.01)
*E21B 47/00* (2012.01)

(58) Field of Classification Search
CPC ........ G01V 3/08; G01V 3/30; E21B 47/0025; E21B 49/005; E21B 47/00
USPC .................... 324/323, 347, 354, 355, 376
See application file for complete search history.

(56) References Cited

U.S. PATENT DOCUMENTS

| | | | |
|---|---|---|---|
| 3,379,963 A | 4/1968 | Saurenman | |
| 3,379,964 A | 4/1968 | Segesman | |
| 3,579,098 A | 5/1971 | Mougne | |
| 4,251,773 A | 2/1981 | Cailliau et al. | |
| 4,468,623 A | 8/1984 | Gianzero et al. | |
| 4,545,242 A | 10/1985 | Chan | |
| 4,567,759 A | 2/1986 | Ekstrom et al. | |
| 4,692,908 A | 9/1987 | Ekstrom et al. | |
| 4,851,781 A | 7/1989 | Marzetta et al. | |
| 4,862,090 A | 8/1989 | Vannier et al. | |
| 5,008,625 A | 4/1991 | Chen | |
| 5,012,193 A | 4/1991 | Chen | |
| 5,038,378 A | 8/1991 | Chen | |
| 6,191,588 B1 | 2/2001 | Chen | |
| 6,809,521 B2 | 10/2004 | Tabarovsky et al. | |
| 7,265,553 B2 | 9/2007 | Cheung et al. | |
| 7,385,401 B2 | 6/2008 | Itskovich et al. | |
| 7,896,073 B2 | 3/2011 | Forgang et al. | |
| RE42,493 E | 6/2011 | Tabarovsky et al. | |
| 8,579,037 B2 | 11/2013 | Jacob | |
| 2008/0265893 A1* | 10/2008 | Snyder ..................... | G01V 3/28 324/343 |
| 2008/0265894 A1* | 10/2008 | Snyder ..................... | G01V 3/28 336/84 R |
| 2010/0013487 A1 | 1/2010 | Bloemenkamp | |
| 2010/0097067 A1* | 4/2010 | Synder, Jr. ............... | G01V 3/28 324/339 |
| 2012/0326723 A1 | 12/2012 | Bloemenkamp et al. | |
| 2013/0013210 A1 | 1/2013 | Itskovich et al. | |
| 2013/0024120 A1 | 1/2013 | Bespalov et al. | |
| 2015/0160366 A1 | 6/2015 | Bespalov et al. | |
| 2017/0212269 A1* | 7/2017 | Itskovich ................. | G01V 3/26 |
| 2021/0124081 A1* | 4/2021 | Donderici ............... | E21B 49/00 |

OTHER PUBLICATIONS

Le, F., Bal, A. A., Bespalov, A., Corley, B., Forgang, S., Gold, R., . . . Gaafar, G. R. (2014). High-Definition Resistivity Imaging of Low-Resistivity Formations Drilled with Nonconductive Mud Systems for Near-Wellbore Geological and Petrophysical Reservoir Evaluation. Offshore Technology Conference-Asia.
SPWLA 61st Annual Logging Symposium, Guner, et al., Quantitative Demonstration of a High-Fidelity Oil-Based Mud Resistivity Imager using a Controlled Experiment, Jun. 24 to Jul. 29, 2020.
Chen, et al. A Novel Array Laterolog Method, Oct. 1998.
SPWLA 38th Annual Logging Symposium, Vigne, et al., Strange Invasion Profiles: What Multiarray Induction Logs can tell us about how Oil-Based Mud affects the invasion process and wellbore stability, Jun. 1997.
SPE22726, Safinya, et al., Improved Formation Imaging with Extended Microelectrical Arrays, 1991.
SPE30584, Smits, et al., High Resolution from a New Laterolog with Azimuthal Imaging, 1995.
SPE Formation Evaluation, Davies, et al., Azimuthal Resistivity Imaging: A New-Generation Laterolog, Sep. 1994.
SPE401, Suau, et al., The Dual Laterolog-R Tool, Jul. 1973.

* cited by examiner

ELECTROMAGNETIC INSULATING COMPONENT USED IN WELL LOGGING TOOL PAD

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, one type of downhole tool may include borehole imager tools used in obtaining a detailed characterization of reservoirs. These borehole imager tools may provide a resistivity image of the formation immediately surrounding the borehole. Borehole imager tools may be used to determine formation stratigraphy, dips of the formation layers as well as, borehole and formation stress. During drilling operations borehole imager tools may be particularly important in learning about thin beds and fracture locations. Borehole image tools may include a pad on which sensors may be mounted, which may include transmitters and receivers. The pad may be supported by an extension, such as arm, which may be made of metallic material. The extension may be used to extend the pad away from the tool mandrel toward the borehole walls. One or more transmitters on the pad may inject electric current into the formation and returned to one or more receivers on the pad. The returned current may be recorded and processed to generate a formation resistivity image. However, the coupling of electromagnetic signal between the tool mandrel and pad may be observed, which affects the measurement of intended signal. The coupling becomes stronger with the increase of the electromagnetic signal frequency, causing severe signal interference for some tools working at high frequency.

BRIEF DESCRIPTION OF THE DRAWINGS

For a detailed description of the preferred examples of the invention, reference will now be made to the accompanying drawings in which.

DETAILED DESCRIPTION

Figure 1:
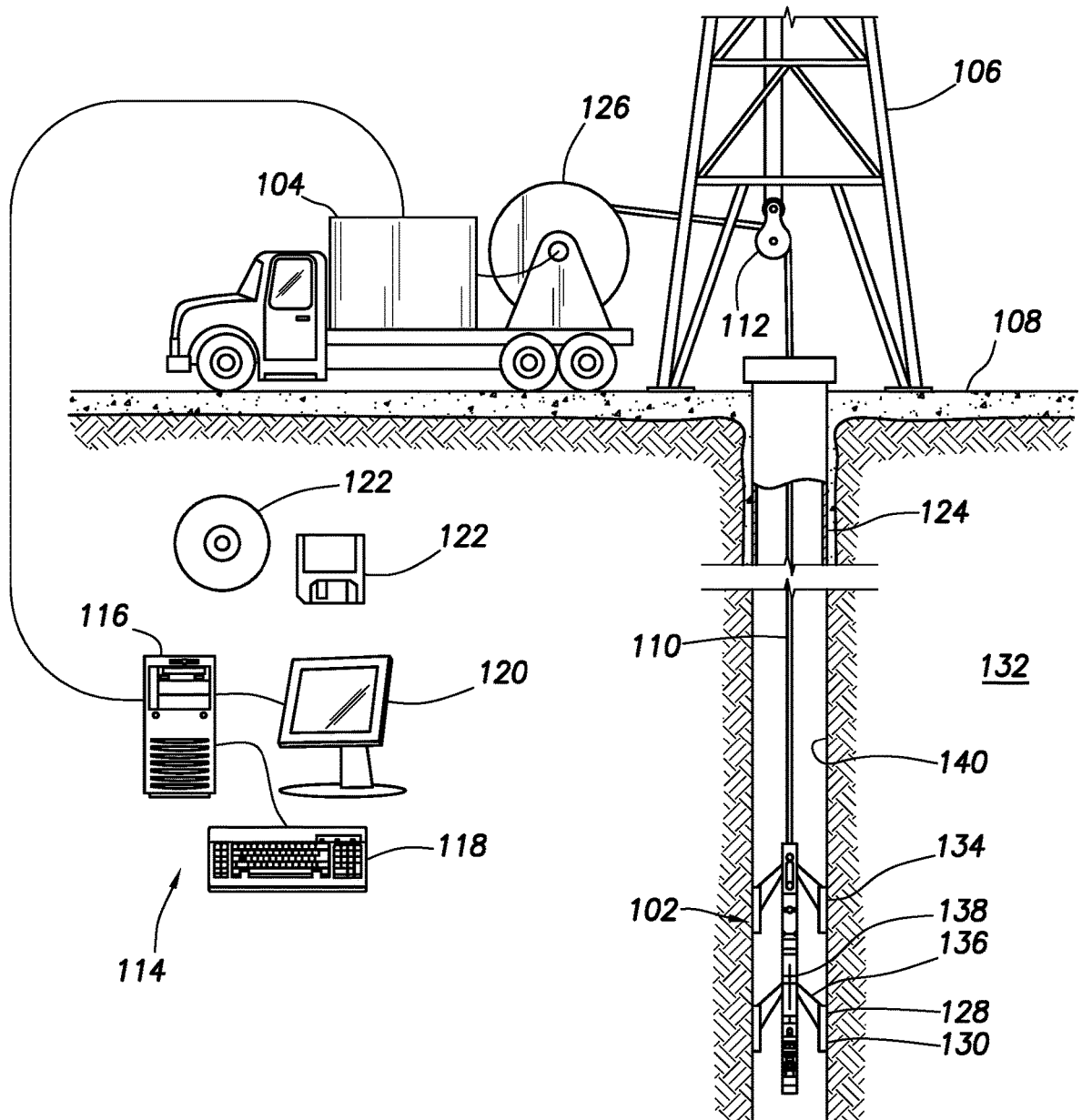
FIG. 1 illustrates an example of a well measurement system.

The present disclosure relates generally to downhole tools, and more particularly, to downhole tools that include a signal filter to reduce returned current through the tool mandrel. Among other things, by reduction of this returned current a more accurate image of the formation surrounding the borehole may be obtained from the downhole tool, such as oil-based mud imager tools. In particular, a resistivity image may be provided with improved contrast in low resistivity formations where traditional oil-based mud imagers have performed poorly.

The systems and methods disclosed herein may be implemented with a downhole tool. The downhole tool may be used to measure formation properties, such as permeability, porosity, resistivity, and other properties. The downhole tool may include a tool mandrel and one or more pads. The pads may carry one or more sensors, which may include transmitters and receivers. Each of the one or more pads may be coupled to the tool mandrel by an extension. Any suitable extension may be used, including but not limited to, an arm, a mechanism configured as a parallelogram (e.g., a scissor-like arrangement), a mechanism configured as a trapezium, and/or any combinations thereof. The extension may be operable to adjust radial position of the pads by extending away from or retracting toward the tool mandrel. In operation, the pads may be pushed outward from the tool mandrel toward the borehole wall. To measure the formation resistivity (or other suitable formation property), one or more transmitters on the pad may inject an electric current into the formation. Most of the current may come out from the transmitter and return to the receiver. However, there may still be a considerable amount of current flowing from the transmitter through the formation, mandrel and arm and back to the receiver. This problem may be especially prevalent when the formation resistivity is low. This returned current from the tool mandrel may be suppressed by the signal filter, which may result in a more focused measurement current. Thus, the imaging tool may become more robust for low-resistivity formations and the measured formation resistivity may be more representative of the true value. For example, the signal filter may enable measurement of formation resistivities in formations with resistivities as low as 0.1. However, it should be understood, that the image tool may be used any suitable formation depending a number of factors, including formations with a formation resistivity ranging from about 0.1 Ω-m to about 10,000 Ω-m or even greater.

The signal filter may be designed to suppress the passage of electrical current returning to the pad through the tool mandrel within a specific frequency range. The signal filter may be disposed in the downhole tool in several ways to achieve the desired suppression. For example, the signal filter may be disposed on the arm connecting the pad to the tool mandrel and/or on the tool mandrel. Any suitable signal filter capable of electrically isolating the mandrel from the measurement system may be used. Suitable signal filters may include, but are not limited to, a soft magnetic material. A soft magnetic material may be any material that has a low retentivity, low coercivity, and may be easily magnetized and demagnetized. Soft magnetic materials may be characterized by their relative permeability. Accordingly, as disclosed herein, the term "soft magnetic material" refers to materials with a high relative permeability in that the soft magnetic material has a relative permeability of about 20 or greater. Suitable relative permeabilities for the soft magnetic material may range from 20 to about 1,000, from about 50 to about 1,000, from about 80 to about 1,000, or from about 200 to about 1,000. Optionally, soft magnetic material may have a suitable relative permeability of about 20 to about 1,000,000, or from about 20 to about 250,000, or from about 250,000 to about 500,000, or from about 500,000 to about 750,000, or from about 750,000 to about 1,000,000. The relative permeability for a soft magnetic material may be tested in accordance with ASTM A341/A341M-16: Standard Test Method for Direct Current Magnetic Properties of Soft Magnetic Materials Using D-C Permeameters and the Point by Point (Ballistic) Test Methods. It should be noted that, the higher the relative permeability of the soft magnetic material is, the smaller the signal filter can be. Suitable soft magnetic materials may include, but are not limited to, ferrites, iron, iron-silicon alloys, nickel-iron alloys, iron-aluminum alloys, iron-cobalt alloys, low-carbon steels, iron-aluminum-silicon alloys, amorphous alloys, and/or any combination thereof.

Signal filters may be any suitable size. Suitable lengths for the signal filter may include, but are not limited to, about 1 inch (2.5 cm) to about 10 inches (25 cm), or about 1 inch (2.5 cm) to about 5 inches (12.7 cm), or about 5 inches (12.7) to about 10 inches (25 cm). Signal filters may be of any suitable thickness. Suitable thicknesses may include, but are not limited to, about 0.02 inches (0.05 cm) to about 1 inch (2.5 cm), or about 0.02 inches (0.05 cm) to about 0.5 inches (1.2 cm), or about 0.5 inches (1.2 cm) to about 1 inch (2.5 cm). However, the scope of the disclosure should not be limited to these values for size of the signal filter. Rather, the signal filter may have any suitable dimensions as desired for a particular application. Where the signal filter is disposed on the tool mandrel, the signal filter may be placed around the mandrel in close proximity to the arm connecting the mandrel to the measuring system.

Signal filters may be disposed in the system in any suitable manner capable of electrically isolating the mandrel from the measurement system. In this example, the signal filter may be in the form of a wrap, a sleeve, and/or a choke that is disposed on the extension and/or the tool mandrel. The signal filter forms may differ in size, shape, and/or thickness. The signal filter may be in ribbon or other suitable form for wrapping around the extension and/or tool mandrel. The signal filter may be wrapped on at least a portion of the extension and/or tool mandrel. In an embodiment, a gap may be present between the ends of the signal filter so that the signal filter may not completely cover the diameter of the arm and/or tool mandrel. Optionally, the signal filter may be wrapped around the entire diameter of the extension and/or tool mandrel. The size of signal filter used may be directly related to the relative permeability of the soft magnetic material. The higher the relative permeability, the smaller the signal filter may be.

Alternatively, the signal filter may be in the form of a sleeve or choke. The sleeve or choke may cover at least a portion of the tool mandrel and/or the extension connecting the pad to the tool mandrel. Optionally, the sleeve or choke may cover the entire extension connecting the pad to the tool mandrel. The sleeve or choke may be any suitable length, thickness, and shape. The signal filter may be in any suitable form capable of minimizing unwanted currents in the measurement system that return through the tool mandrel and should not be limited to the configurations described herein.

FIG. 1 illustrates a cross-sectional view of a well measurement system 100. As illustrated, well measurement system 100 may comprise downhole tool 102 attached to a winch unit 104. In examples, it should be noted that downhole tool 102 may not be attached to a winch unit 104. Downhole tool 102 may be supported by rig 106 at surface 108. Downhole tool 102 may be tethered to winch unit 104 through conveyance 110. Conveyance 110 may be disposed around one or more sheave wheels 112 to winch unit 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102.

Conveyance 110 may comprise, in some instances, a plurality of electrical conductors extending from winch unit 104. Conveyance 110 may comprise an inner core of seven electrical conductors (not shown) covered by an insulating wrap. An inner and outer steel armor sheath may be wrapped in a helix in opposite directions around the conductors. The electrical conductors may be used for communicating power and telemetry between winch unit 104 and downhole tool 102.

Conveyance 110 may lower downhole tool 102 in borehole 124. Generally, borehole 124 may include horizontal, vertical, slanted, curved, and other types of borehole geometries and orientations. Imaging tools may be used in uncased sections of the borehole. Measurements may be made by downhole tool 102 in cased sections for purposes such as calibration.

As illustrated, borehole 124 may extend through formation 132. As illustrated in FIG. 1, borehole 124 may extend generally vertically into the formation 132, however borehole 124 may extend at an angle through formation 132, such as horizontal and slanted boreholes. While FIG. 1 generally depicts a land-based operation, those skilled in the art may recognize that the principles described herein are equally applicable to subsea operations that employ floating or sea-based platforms and rigs, without departing from the scope of the disclosure.

Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a resistivity image of formation 132 surrounding borehole 124. This resistivity image may depict boundaries of subsurface structures, such as a plurality of layers disposed in formation 132. These images may be used in reservoir characterization. Images may be considered high resolution, which may allow accurate identification of thin beds and other fine features such as fractures, clasts and vugs. These images may provide information about the sedimentology, lithology, porosity and permeability of formation 132. The images may complement, or in some cases replace, the process of coring.

Downhole tool 102 may comprise a plurality of sensors, such as transmitters and receivers. The sensors may include any suitable sensor for transmitting current and/or current measurements, including, but not limited to measurement electrodes. In an embodiment, measurement electrodes. As illustrated, the sensors may include an array of electrodes, shown on FIG. 1 as injection electrode 128. Downhole tool 102 may also comprise a return electrode 130. It should be noted that the plurality of electrodes of injection electrode 128 may be any suitable electrode and is should be further noted that return electrode 130 may be any suitable electrode. Injection electrode 128 and/or return electrode 130 may be disposed on at least one pad 134 in any suitable order. For example, a pad 134 may include only injection arrays 128 and/or return electrodes 130. Further, a pad 134 may comprise both injection electrode 128 and return electrodes 130. Pads 134 may be attached to tool mandrel 138 by at least extension, such as arm 136 that may extend from tool mandrel 138. Arm 136 may extend pad 134 away from tool mandrel 138. In examples, arm 136 may place pad 134 in contact with borehole wall 140. It should be noted that there may be a plurality of arms 136. One or more arms 136 may place an arrangement of injection arrays 128 and/or return electrode 130 in close proximity to the wall of borehole 124. In an embodiment, downhole tool may comprise a signal filter (not shown). The borehole 140 may contain a fluid, such as an oil-based or synthetic-based drilling mud in which oil or a synthetic fluid may be the continuous phase.

During operations, an operator may energize an individual electrode, or any number of electrodes, of injection electrode 128. A voltage may be applied between the injection electrode 128 and return electrode 130. The level of the voltage may be controlled by information handling system 114. This may cause currents to be transmitted through the electrode of injection electrode 128 and into formation 132. It should be noted that there may be any number of currents transmitted into formation 132. These currents may travel through the fluid disposed in borehole 124, into formation 132 and may reach back to return electrode 130. The amount of current emitted by each electrode of injection electrode 128 may be inversely proportional to the impedance seen by the electrode. This impedance may be affected by the properties of formation 132 and the mud directly in front of each electrode of the injection electrode 128. Therefore, current emitted by each electrode may be measured and recorded in order to obtain an image of the resistivity of formation 132. Alternatively, current may be emitted from the return electrode 130 and returned to injection electrode 128.

In examples, downhole tool 102 may operate with additional equipment (not illustrated) on surface 108 and/or disposed in a separate well measurement system (not illustrated) to record measurements and/or values from formation 132 to render a resistivity image of formation 132. Without limitation, downhole tool 102 may be connected to and/or controlled by information handling system 114, which may be disposed on surface 108. Without limitation, information handling system 114 may be disposed downhole in downhole tool 102. Processing of information recorded may occur downhole and/or on surface 108. In addition to, or in place of, processing at surface 108, processing may occur downhole. Processing occurring downhole may be transmitted to surface 108 to be recorded, observed, and/or further analyzed. Additionally, information recorded on information handling system 114 that may be disposed downhole may be stored until downhole tool 102 may be brought to surface 108. In examples, information handling system 114 may communicate with downhole tool 102 through a fiber optic cable (not illustrated) disposed in (or on) conveyance 110. In examples, wireless communication may be used to transmit information back and forth between information handling system 114 and downhole tool 102. Information handling system 114 may transmit information to downhole tool 102 and may receive as well as process information recorded by downhole tool 102. In examples, a downhole information handling system (not illustrated) may include, without limitation, a microprocessor or other suitable circuitry, for estimating, receiving and processing signals from downhole tool 102. Downhole information handling system (not illustrated) may further include additional components, such as memory, input/output devices, interfaces, and the like. In examples, while not illustrated, downhole tool 102 may include one or more additional components, such as analog-to-digital converter, filter and amplifier, among others, that may be used to process the measurements of downhole tool 102 before they may be transmitted to surface 108. Alternatively, raw measurements from downhole tool 102 may be transmitted to surface 108.

Any suitable technique may be used for transmitting signals from downhole tool 102 to surface 108. As illustrated, a communication link (which may be wired or wireless and may be disposed in conveyance 110, for example) may be provided that may transmit data from downhole tool 102 to an information handling system 114 at surface 108.

Figure 2:
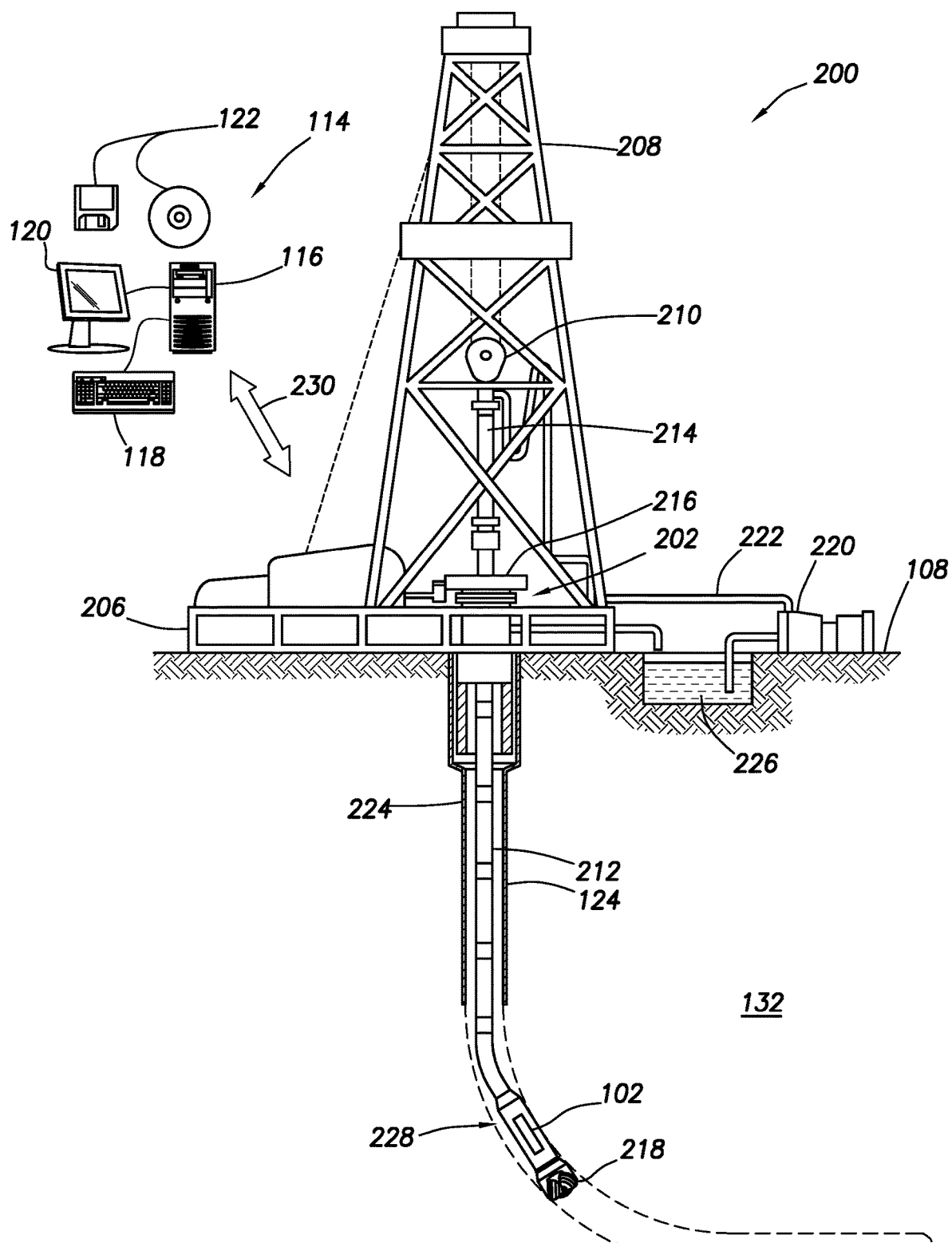
FIG. 2 illustrates another example of a well measurement system.

FIG. 2 illustrates an example in which downhole tool 102 may be disposed in a drilling system 200. As illustrated, borehole 124 may extend from a wellhead 202 into formation 132 from surface 108. As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various formations 132. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108 (Referring to FIG. 1). Drill bit 218 may be a part of bottom hole assembly 228 at distal end of drill string 212. Bottom hole assembly 228 may further comprise downhole tool 102 (Referring to FIG. 1). Downhole tool 102 may be disposed on the outside and/or within bottom hole assembly 228. Downhole tool 102 may comprise test cell 234. As will be appreciated by those of ordinary skill in the art, bottom hole assembly 228 may be a measurement-while drilling (MWD) or logging-while-drilling (LWD) system.

Without limitation, bottom hole assembly 228 may be connected to and/or controlled by information handling system 114, which may be disposed on surface 108. Without limitation, information handling system 114 may be disposed downhole in bottom hole assembly 228. Processing of information recorded may occur downhole and/or on surface 108. Processing occurring downhole may be transmitted to surface 108 to be recorded, observed, and/or further analyzed. Additionally, information recorded on information handling system 114 that may be disposed downhole may be stored until bottom hole assembly 228 may be brought to surface 108. In examples, information handling system 114 may communicate with bottom hole assembly 228 through a fiber optic cable (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may include a processing unit 116, a video display 120, an input device 118 (e.g., keyboard, mouse, etc.), and/or non-transitory computer-readable media 122 (e.g., optical disks, magnetic disks) that may store code representative of the methods described herein. In addition to, or in place of, processing at surface 108, processing may occur downhole.

Figure 3:
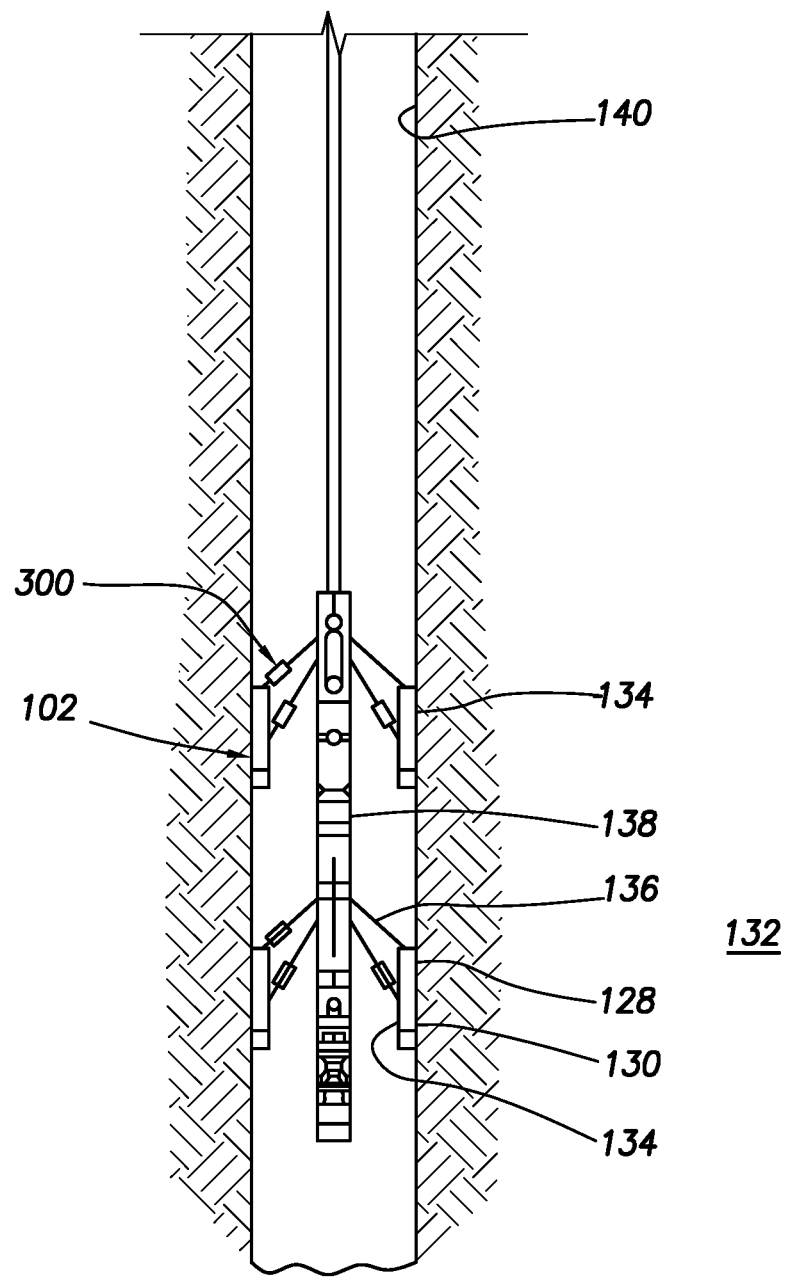
FIG. 3 illustrates an example of a downhole tool.

FIG. 3 illustrates an example of downhole tool 102. Downhole tool 102 may comprise, tool mandrel 138, pad 134, arm 136. Pad 134 may serve to place sensors, such as injection electrode 128 and/or return electrode 130 in contact with or in close proximity to borehole 124. Pad 134 may comprise at least one injection electrode 128, at least one return electrode 130, a guard (not shown), and a housing 302. In examples, there may be a plurality of injection electrode 128. In examples, return electrode 130 and injection electrode 128 may be disposed directly on downhole tool 102. Optionally, return electrode 130 and injection electrode 128 may be disposed on pad 134. Injection electrode 128 may be a sensor that senses impedance of formation 132. It should be noted that injection electrode 128 may be a button electrode. There may be any suitable number of injection electrodes 128 within injection electrode 128 that may produce a desired, predetermined current. Without limitation, the range for a suitable number of injection electrodes 128 within injection electrode 128 may be from about one injection electrode 128 or greater.

In examples, there may be a plurality of return electrodes 130. One of the return electrodes 130 may be disposed on one side of injection electrode 128, and another one of the return electrodes 130 may be disposed on the opposite side of injection electrode 128. These return electrodes 130 may be disposed at equal distances away from injection electrode 128 or at varying distances from injection electrode 128. In examples, a voltage difference between injection electrode 128 and return electrodes 130 may be applied, which may cause currents to be emitted from injection electrode 128 into the mud (not illustrated) and formation 132 (referring to FIG. 1).

During operations, an operator may energize injection electrode 128. A voltage may be applied between one or more electrodes of injection electrode 128 and return electrode 130. The level of the voltage may be controlled by information handling system 114. This may cause currents to be transmitted through injection electrode 128. These currents may travel through the mud and formation 132 and may reach back to return electrode 130. The amount of current emitted by each injection electrode 128 may be inversely proportional to the impedance seen by that injection electrode 128. This impedance may be affected by the properties of formation 132 and the mud directly in front of each injection electrode 128. Therefore, current emitted by each injection electrode 128 may be measured and recorded in order to obtain an image of the resistivity of formation 132.

Most of the transmitted current may be returned to return electrodes 130 although some portions of it may return through tool mandrel 138. To reduce current returned through tool mandrel 138, downhole tool 102 may further a signal filter 300. Any suitable signal filter 300 may be used. As illustrated, signal filter 300 may be disposed on arm 136. Signal filter 300 may be of any suitable soft magnetic material which may have a high relative permeability. Any suitable signal filter 300 capable of electrically isolating tool mandrel 138 from the measurement system may be used.

Figure 4:
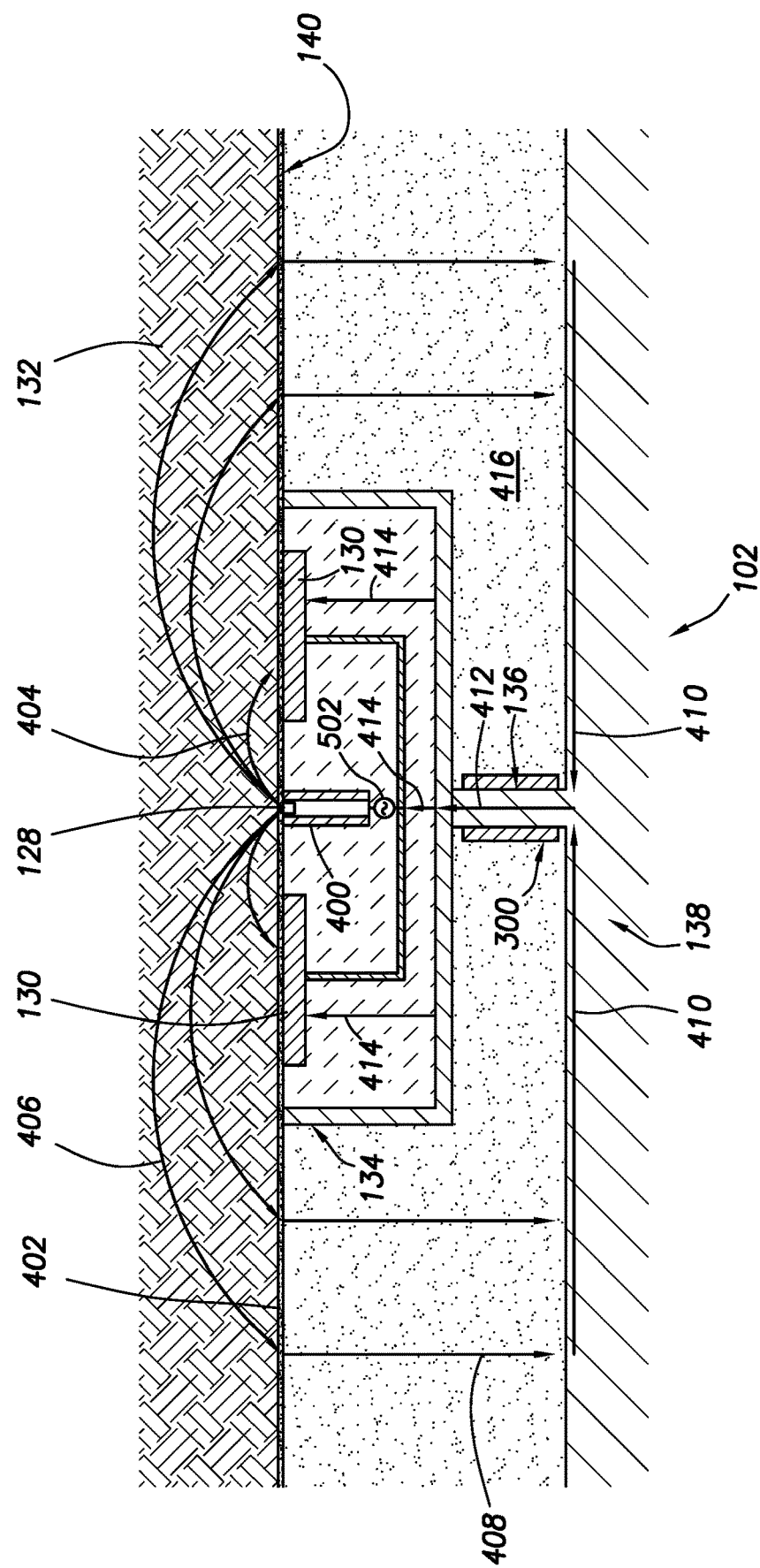
FIG. 4 illustrates an example of a portion of the downhole tool with current paths.

FIG. 4 illustrates a two-dimensional schematic of a downhole tool 102 utilizing a signal filter 300 in the form of a sleeve. Downhole tool 102 may comprise tool mandrel 138 and pad 134. Arm 136 may connect pad 134 to tool mandrel 138. While only a single pad 134 and arm 136 are illustrated, downhole tool 102 may include more than one pad 134 and arm 136. Any suitable tool mandrel 138 may be used. In an embodiment, a suitable tool mandrel 138 may comprise a metal. Impedance measurements may be taken when pad 134 is in direct contact with borehole wall 140. Arm 136 may extend to allow pad 134 to contact borehole wall 140 (or mudcake 402 disposed on borehole wall 140). Pad 134 may include injection electrode 128 and return electrodes 130. Guard 400 may also be provided on pad for focusing current produced by one or more electrodes (none shown separately) on injection electrode 128 into formation 132 radially. Guard 400 may be disposed around injection electrode 128. Guard 400 may include the same potential as injection electrode 128.

For measurement, a voltage 502, which may be high frequency, may be applied between one or more electrodes of injection electrode 128 and return electrodes 130. A high-frequency voltage refers to a voltage with a frequency ranging from about 10 kHz to about 1 GHz, or from about 10 kHz to about 500,000 kHz, or from about 500,000 kHz to about 1 GHz. This may cause a current to flow from injection electrode 128, through the mudcake 402 which may be between the end of injection electrode 128 and formation 132. At least a portion of the current may flow into formation 132 and back into return electrodes 130. This path for the current may also be referred to herein as return current and is shown on FIG. 4 by arrows 404. Information handling system may record return current. Information handling system may then analyze the recorded return current and may then generate a formation resistivity image. At least a portion of the current may return back to pad 134 via tool mandrel 138 and arm 136. In an embodiment, this current return may follow a transmission line model. The pad 134 may operate in megahertz range, which may cause the current to accumulate and propagate along the surface of the borehole wall 140. This may also be referred to herein as the leak current as shown by arrow 406. The current may then capacitively return to tool mandrel 138. This current may be referred to herein as the mandrel leak current. The near-borehole formation of low resistivity, the metal tool mandrel 138 together with the non-conductive mud form a lossy coaxial waveguide so that the mandrel leak current may return to pad 134 by way of tool mandrel 138 and arm 136. The mandrel leak current may return to tool mandrel through mud 416 as shown by arrows 408. The mandrel leak current may travel along tool mandrel 138 to arm 136, as shown by arrows 410. From tool mandrel 138, the mandrel leak current may then pass through arm 136 to pad 134 as shown by arrows 412, where the mandrel leak current may then return to injection electrode 128 and return electrodes, as shown by arrows 414. This effect, which may also be referred herein as the mandrel return effect, may contribute to a low-resistivity artifact of the measurement.

It may be advantageous to reduce the mandrel-return effect. In an embodiment, the mandrel-return effect may be reduced by isolating pad 134 by way of fabricating arm 136 to comprise an insulator (not shown). Any suitable insulator may be used. However, said fabrication may increase the cost of production, as arm 136 and insulator (not shown) must be fabricated in a way such that they may be capable of withstanding high temperature and high-pressure borehole environments. Optionally, the mandrel-return effect may also be reduced by separating waveguide from the pad 134 with the return electrode 130 and injection electrode 128. This separation may be accomplished by electrically decoupling the pad 134 from mandrel 138. To decrease the electrically coupling between pad 134 and tool mandrel 138, signal filter 300 may be used. As illustrated, signal filter may be disposed on arm 136. Signal filter 300 may be in the form of a sleeve. Alternatively, signal filter 300 may be in the form of a wrap, choke, or other suitable configuration. Signal filter 300 may surround at least a portion of arm 136. Signal filter 300 may comprise any suitable material, diameter, length, and relative permittivity, as previously discussed. Signal filter 300 may decrease the coupling of the pad 134 with return electrode 130 and injection electrode 128 from tool mandrel 138 within a suitable frequency range. This may occur for any suitable frequency range. Suitable frequency ranges may include, but are not limited to, from about 10 kHz to about 1 GHz, or about 10 kHz to about 500,000 kHz, or about 500,000 kHz to about 1 GHz. Signal filter 300 may be disposed on arm 136 in any suitable manner. The inclusion of signal filter 300 may suppress the mandrel leak current and in turn may increase the amount of return current. This increased amount of return current may result in more accurate resistivity images.

Figure 5:
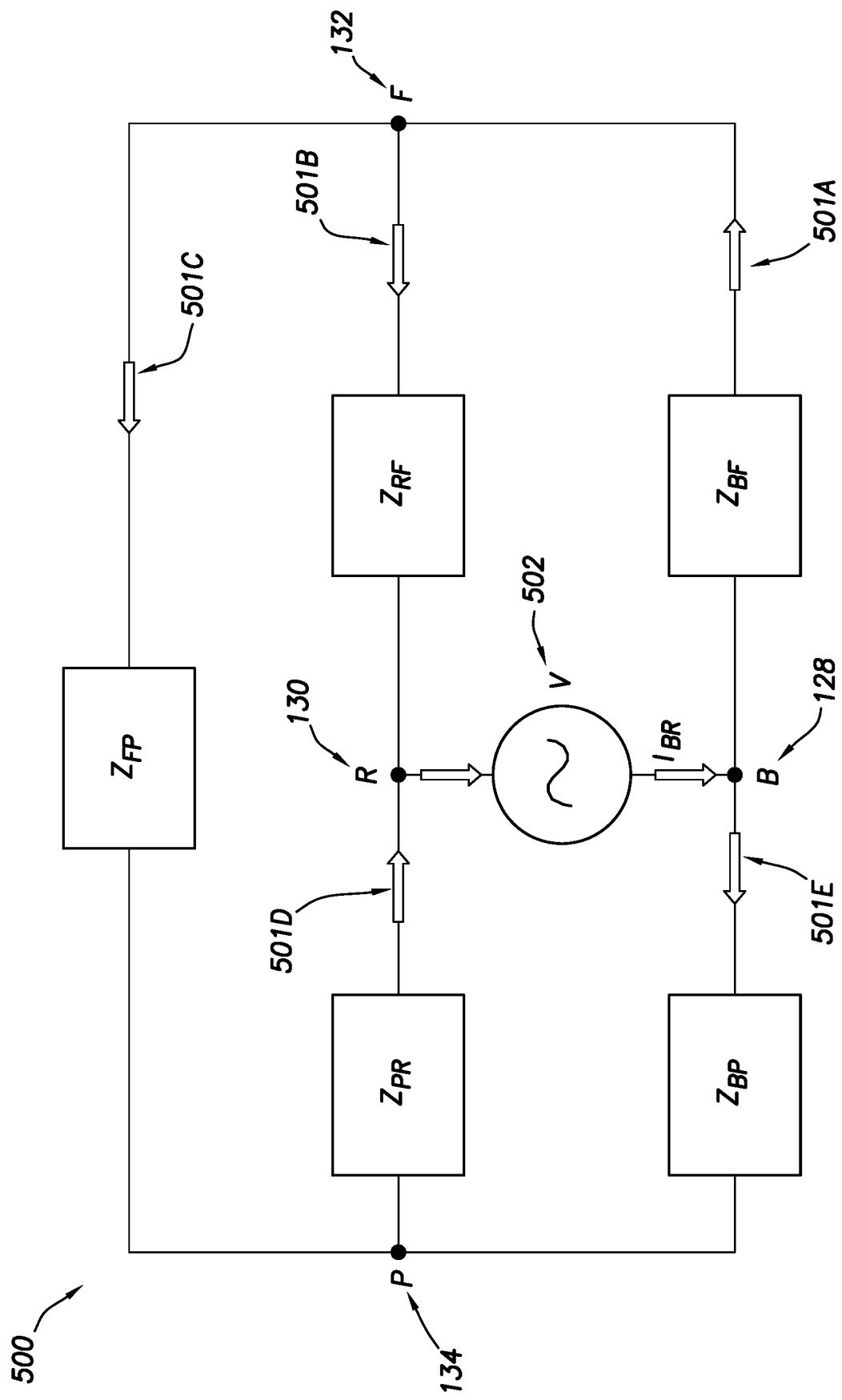
FIG. 5 illustrates an example of an equivalent circuit model for the downhole tool of FIG. 4.

FIG. 5 illustrates a lumped-circuit model 500 for the arrangement of FIG. 4. A voltage 502, which may be high frequency, may be applied between one or more electrodes of injection electrode 128 and return electrodes 130. Currents produced by the voltage 502 may then flow through a variety of different paths. For example, current 501A may flow from the injection electrode 128 to the formation 132. The impedance from injection electrode 128 to the formation 132 may be represented by $Z_{BF}$. Current 501B may then flow from formation 132 back to return electrodes 130. The impedance from formation 132 to return electrodes 130 may be represented by $Z_{RF}$. This current 501B may also be referred to as the return current. Additionally, current 501A may flow from injection electrode 128 to formation 132. Current 501C may then flow from formation 132 to pad 134. Current 501C may also be referred to as leakage current from formation 132. The impedance from formation 132 to pad 134 may be represented by $Z_{FP}$. To reduce this current 501C (or leakage current), the impedance $Z_{FP}$ may be increased, for example, by inclusion of signal filter 300 (e.g., shown on FIG. 4). Current 501D may flow from pad 134 to return electrodes 130. The impedance from pad 134 to return electrodes 130 may be represented by $Z_{PR}$. Current 501E may flow from injection electrode 128 to pad 134. The impedance from injection electrode 128 to pad 134 may be represented by $Z_{BP}$. Current 501E may also be referred to as current leakage from backside of pad 134. It is to be understood that this are just examples of paths a current may take and any suitable current path may be utilized.

The overall calculated impedance Z may be calculated using the formula below:

$$Z = \frac{V_i}{I_m} \quad (1)$$

where $V_i$ is the voltage 502, $I_m$ is the current measured at one or more electrodes of injection electrode 128, which includes the return current 404 and the leakage current. The measured current flowing into the injection electrode 128 may be calculated using the following formula:

$$I_m = I_{BF} = I_{RF} + I_{FP} \quad (2)$$

where $I_{BF}$ is current 501A measured from injection electrode 128 to the formation 132 along, $I_{RF}$ is current 501B measured from formation 132 to the return electrodes 130, and $I_{FP}$ is current 501C measured from the formation 132 and to the pad 134. In an embodiment, downhole tool 102 may be designed so that the $Z_{BP}$ from injection electrode 128 to pad 134 is so large, it may prevent the current leakage $I_{BP}$, from backside of pad 134 (current 501E). Thus, the calculated impedance Z may be a good approximation of the actual impedance $Z_{BF}$, if the leakage current, $I_{FP}$, through formation 132 (current 501C) may be small when compared to the returned current, $I_{RF}$, from formation 132 to return electrodes (current 501B). The calculated impedance Z may comprise a mud impedance and a formation impedance in series. The real part of the impedance $Z_{BF}$ may be determined by the mudcake 402 (e.g., shown on FIG. 4) and formation 132, whereas the imaginary part of the impedance may be determined by the mudcake 402 alone. The overall resistance of the formation 132 may be determined using the real part of the impedance. Optionally, one way to determine the formation resistivity may be to multiply the real part of the formation impedance by a scaling factor determined by the tool geometry. Any suitable scaling factor may be used.

Figure 6:
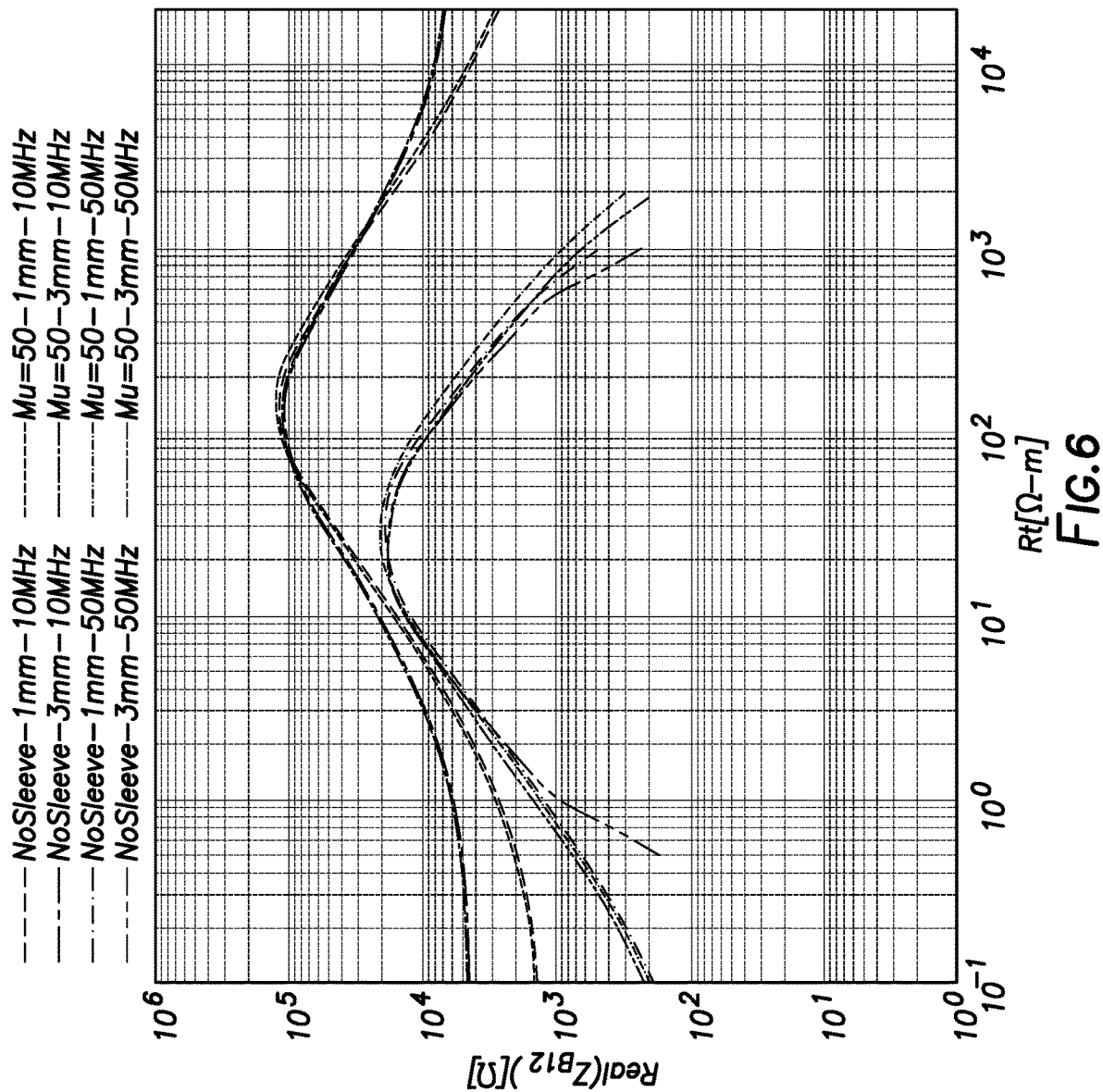
FIG. 6 illustrates an example of a response of a downhole tool.

FIG. 6 illustrates the response of downhole tool 102 (e.g., FIG. 4) in a homogeneous and isotropic formation at operating frequencies of 10 megahertz (MHz) and 50 MHz. Any borehole mud with a suitable resistivity may be used. Suitable resistivity of the borehole mud may be about 1,000 ohm or greater. In some examples, the borehole mud may be generally non-conductive as will be appreciated by those of ordinary skill in the art. In the example of FIG. 6, the resistivity of the borehole mud is 8,000 Ohm-meters (Ω-m). The borehole mud and formation may have any suitable relative permittivity. Suitable relative permittivity's may include, but are not limited to, from about 3 to about 80, or about 3 to about 30, or about 30 to about 80. The relative permittivity's of the borehole mud and formation in the example of FIG. 6 are 6 and 15, respectively. Signal filter 300 may be used. For this example, the downhole tool 102 included a signal filter 300 in the form of a ferrite sleeve disposed on the arm 136, as shown on FIG. 4. an embodiment, signal filter 300 was in the form of a ferrite sleeve disposed on arm 136. However, suitable signal filters 300 may be of any suitable material, size, shape, thickness and length, as previously described. Signal filter 300 used in the example of FIG. 6 had a thickness of about 0.1 inches and a length of about 5.5 inches. Signal filter 300 may have any suitable relative permeability. Suitable relative permeability may include those described above for a soft magnetic material. The ferrite sleeve used in the example of FIG. 6 had a relative permittivity of about 50.

A downhole tool 102 with signal filter 300 and a downhole tool 102 without signal filter 300 were modeled at frequencies of 10 MHz and 50 MHz and the results are shown in FIG. 6. The tests were also performed at standoffs of 1 mm and 3 mm. It should be noted that any suitable standoff distance may be used and should not be limited to the present embodiments. The x-axis represents the formation resistivity and ranges from about 0.1 Ω-m to about 20,000 Ω-m. The y-axis represents the real part of the calculated impedance. For 10 MHz, the real part of the impedance due to the mudcake 402 (e.g., shown on FIG. 4) may be significant within the low formation resistivity range. With the increase of standoff, which generally correlates with the thickness of the mudcake 402, the impedance due to mudcake 402 may become stronger. As illustrated by FIG. 6, the curve for the test at 3 mm standoff and 10 MHZ curves up more than the curve for the test at 1 mm standoff and 10 MHz. For 50 MHz, the real part of the measured impedance may be affected by the mandrel leak current more significantly. For the standoff of 3 mm, the measured impedance reduces rapidly as formation resistivity decreases, which may then eventually drop below zero when formation resistivity is sufficiently low. This may be problematic in formation resistivity inversion. The artifact may be caused by the mandrel-return effect. To reduce (or potentially eliminate) the mandrel-return effect, the impedance $Z_{FP}$ from formation 132 to pad 134 (e.g., shown on FIG. 5) may be increased (or potentially even maximized). For instance, a signal filter 300 (e.g., shown on FIG. 4) may be included on arm 136 (e.g., shown on FIG. 4). The signal filter 300 may increase the impedance $Z_{FP}$, thus improving performance. As further illustrated on FIG. 6, the curve for the test at 50 MHz and 3 mm standoff with signal filter 300, the calculated impedance may be all positive over the range of interest. This result may be because the leak current via the path (e.g., current 501C on FIG. 5) from formation 132 (e.g., shown on FIG. 4) through tool mandrel 138 (e.g., shown on FIG. 4) to pad body may be effectively suppressed by signal filter 300. Moreover, for the same curve at 50 MHz with signal filter 300, the mudcake effect may not be obvious on the low-resistivity side. The calculated impedance may be almost linearly proportional to the formation resistivity, which may provide a great benefit for formation resistivity inversion.

Figure 7:
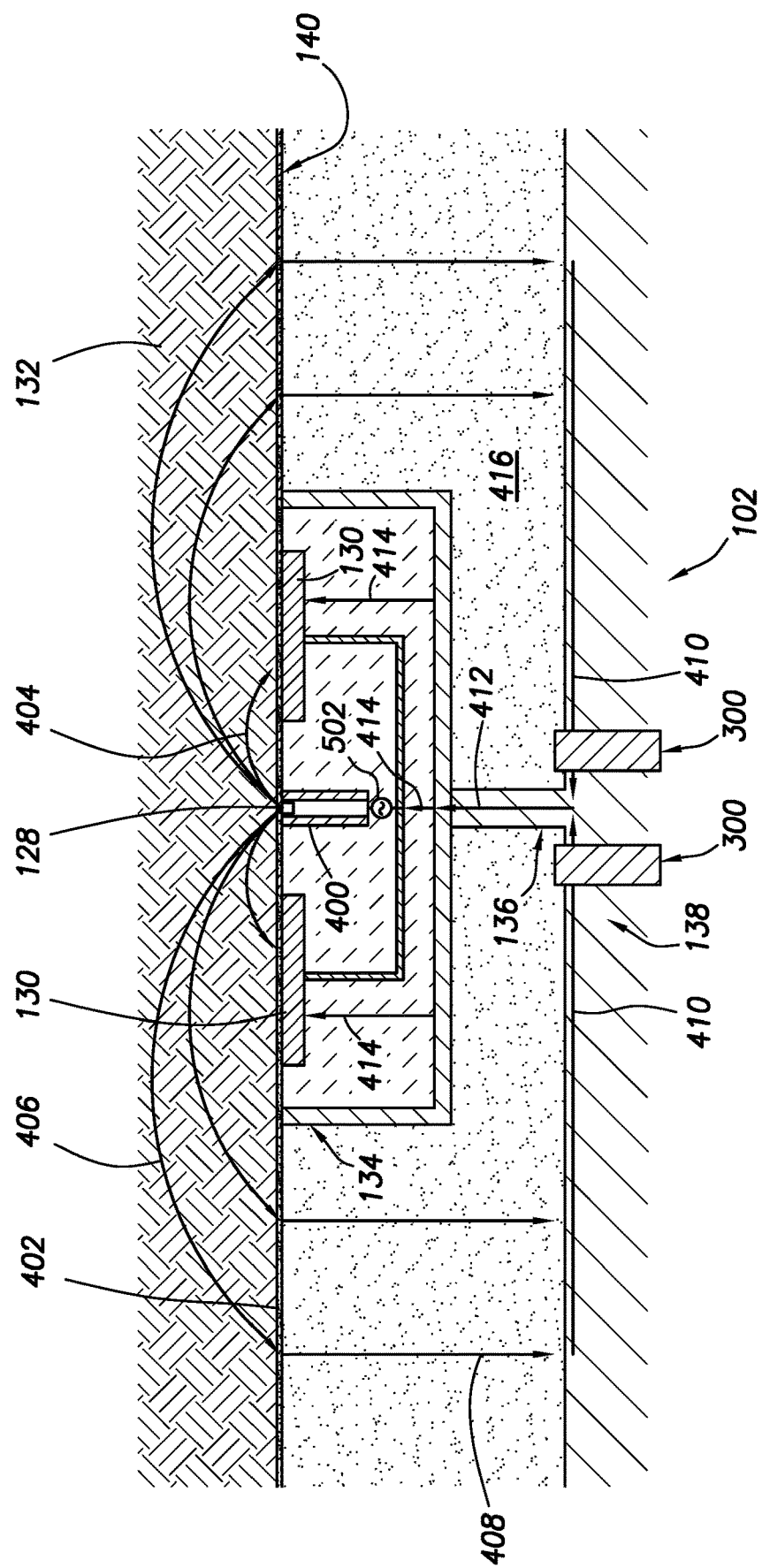
FIG. 7 illustrates another example of a portion of the downhole tool with current paths.

FIG. 7 illustrates a two-dimensional schematic of downhole tool 102 utilizing a signal filter 300 in the form of a choke on tool mandrel 138. Downhole tool 102 may comprise pad 134. Arm 136 may connect pad 134 to tool mandrel 138. While only a single pad 134 and arm 136 are illustrated, downhole tool 102 may include more than one pad 134 and arm 136. Any suitable tool mandrel 138 may be used. In an embodiment, a suitable tool mandrel 138 may comprise a metal. Impedance measurements may be taken when pad 134 is in direct contact with borehole wall 140 (or mudcake 402 disposed on borehole wall 140). Arm 136 may extend to allow pad 134 to contact borehole wall 140. Pad 134 may include injection electrode 128 and return electrodes 130. Guard 400 may also be provided for focusing current produced by one or more electrodes (none shown separately) on injection electrode 128 into formation 132 radially. As illustrated, signal filter 300 may be disposed on tool mandrel 138. In the illustrated embodiment, signal filter 300 may be in the form of a choke wrapped around tool mandrel 138. Alternatively, signal filter 300 may be in the form of a wrap, sleeve, or other suitable configuration. Signal filter 300 may surround at least a portion of tool mandrel 138. Signal filter 300 may comprise any suitable material, diameter, length, and relative permeability, as previously discussed. Signal filter 300 may decrease the coupling of the pad 134 with return electrode 130 and injection electrode 128 from tool mandrel 138.

Without signal filter 300, coupling between formation 132 and tool mandrel 138 may be very strong. With the addition of the signal filter 300, the coupling between the formation 132 and tool mandrel 138 may decrease. Several factors may contribute to the decrease in coupling between formation 132 and tool mandrel 138. Such factors may include, but are not limited to, frequency, voltage, size of the design, the like, and/or any combination thereof. In turn, this decrease may allow most of the current to return to the return electrodes 130 via the path illustrated by arrows 404 and not through tool mandrel 138. Additionally, the signal filter 300 may decrease the amount of leak current produced thereby increasing the amount of return current 404. The leak current is shown on FIG. 7 by arrows 406 and may return to pad through mud 416 (shown by arrows 408), then through tool mandrel (shown by arrows 410), and then through arm 136 (shown by arrows 412) to pad 134 where it returns to pad electrode 130 and injection electrode 128 (shown by arrows 414). This increase in the amount of return current not passing through tool mandrel 138 may result in a more accurate estimation and depiction of the wellbore resistivity imaging.

Statement 1. A downhole tool, comprising: a tool mandrel; a pad comprising a transmitter operable to transmit an electric current into a formation and a receiver operable to receive at least a portion of the electric current from the transmitter; an extension from the tool mandrel that couples the pad to the tool mandrel; and a signal filter positioned in the downhole tool to suppress passage of mandrel leakage current that passes through the tool mandrel to the pad.

Statement 2. The downhole tool of statement 1, wherein the signal filter comprises a soft magnetic material.

Statement 3. The downhole tool of any of statements 1 or 2, wherein the signal filter comprises at least one soft magnetic material selected from the group consisting of a ferrite, iron, iron-silicon alloy, nickel-iron alloy, iron-aluminum alloy, iron-cobalt alloy, low-carbon steel, iron-aluminum-silicon alloy, amorphous alloy, and any combination thereof.

Statement 4. The downhole tool of any of the preceding statements, wherein the soft magnetic material comprises the ferrite.

Statement 5. The downhole tool of any of the preceding statements, wherein the signal filter comprises a soft magnetic material having a relative permeability of about 20 or greater.

Statement 6. The downhole tool of any of the preceding statements, wherein the signal filter comprises a sleeve at least partially wrapped around the extension, wherein the extension comprises an arm that is extendable from the tool mandrel.

Statement 7. The downhole tool of any of the preceding statements, wherein the sleeve is disposed completely around a diameter of the arm.

Statement 8. The downhole tool of any of the preceding statements, wherein the signal filter comprises a choke at least partially wrapped around the tool mandrel.

Statement 9. The downhole tool of any of the preceding statements, wherein the signal filter is in the form of a sleeve, choke, or a wrap.

Statement 10. The downhole tool of any of the preceding statements, wherein the receiver comprises a pair of return electrodes, and wherein the transmitter comprises an array of injection electrodes.

Statement 11. The downhole tool of any of the preceding statements, further comprising a plurality of pads, wherein each of the pads is coupled to the tool mandrel by one or more extensions, wherein each of the pads comprises a transmitter and a receiver.

Statement 12. The downhole tool of any of the preceding statements, wherein the downhole tool is operable to transmit the electric current into the formation at a high frequency of from about 10 kHz to about 1 GHz.

Statement 13. A downhole tool, comprising: a tool mandrel; a pad comprising an array of injection electrodes and a pair of return electrodes, wherein each of the return electrodes are disposed on opposite sides of the array from one another; an arm that couples the pad to the tool mandrel, wherein the arm is extendable from the tool mandrel; and a ferrite sleeve disposed on the arm.

Statement 14. The downhole tool of statement 13, wherein the ferrite sleeve has a relative permeability of about 20 or greater.

Statement 15. The downhole tool of statements 13 or 14, wherein the ferrite sleeve is disposed completely around a diameter of the arm.

Statement 16. The downhole tool of any one of statements 13 to 15, further comprising a plurality of pads, wherein each of the pads is coupled to the tool mandrel by one or more extensions, wherein each of the pads comprises a transmitter and a receiver.

Statement 17. A method of resistivity imaging, comprising: disposing a downhole tool into a borehole; transmitting a current into a formation surrounding the borehole with a transmitter that is extended from a tool mandrel of the downhole tool towards a borehole wall; and recording at least a portion of the current that returns to a receiver of the downhole tool, wherein a signal filter suppress passages of mandrel leakage current that passes through the tool mandrel to a pad on which the transmitter is disposed.

Statement 18. The method of statement 17, further comprising extending the pad from the downhole tool with an arm, wherein the transmitter transmits the current when the pad is in engagement with a mudcake formed on the borehole wall, wherein an oil- or synthetic-based drilling mud is disposed in the borehole, and wherein the formation has a resistivity from about 0.01 Ω-m to about 1 Ω-m.

Statement 19. The method of statements 17 or 18, wherein the signal filter is disposed on the arm or the tool mandrel, wherein the signal filter comprises a soft magnetic material having a relative permeability of about 20 or greater.

Statement 20. The method of any one of statements 17 to 19, further comprising extending the pad from the downhole tool with an arm wherein the signal filter is in the form of a sleeve disposed on the arm.

Although the present invention and its advantages have been described in detail, it should be understood that various changes, substitutions and alterations may be made herein without departing from the spirit and scope of the invention as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

Although the present invention and its advantages have been described in detail, it should be understood that various changes, substitutions and alterations may be made herein without departing from the spirit and scope of the invention as defined by the appended claims.

What is claimed is:

1. A downhole tool, comprising:
   a tool mandrel;
   a pad comprising a transmitter operable to transmit an electric current into a formation and a receiver operable to receive at least a portion of the electric current from the transmitter;
   an extension from the tool mandrel that couples the pad to the tool mandrel; and
   a signal filter positioned in the downhole tool to suppress passage of a leak current that passes first through the formation, through the tool mandrel, and then to the pad.

2. The downhole tool of claim 1, wherein the signal filter comprises a soft magnetic material.

3. The downhole tool of claim 1, wherein the signal filter comprises at least one soft magnetic material selected from the group consisting of a ferrite, iron, iron-silicon alloy, nickel-iron alloy, iron-aluminum alloy, iron-cobalt alloy, low-carbon steel, iron-aluminum-silicon alloy, amorphous alloy, and any combination thereof.

4. The downhole tool of claim 3, wherein the soft magnetic material comprises the ferrite.

5. The downhole tool of claim 1, wherein the signal filter comprises a soft magnetic material having a relative permeability of about 20 or greater.

6. The downhole tool of claim 1, wherein the signal filter comprises a sleeve at least partially wrapped around the extension, wherein the extension comprises an arm that is extendable from the tool mandrel.

7. The downhole tool of claim 6, wherein the sleeve is disposed completely around a diameter of the arm.

8. The downhole tool of claim 1, wherein the signal filter comprises a choke at least partially wrapped around the tool mandrel.

9. The downhole tool of claim 1, wherein the signal filter is in the form of a sleeve, choke, or a wrap.

10. The downhole tool of claim 1, wherein the receiver comprises a pair of return electrodes, and wherein the transmitter comprises an array of injection electrodes.

11. The downhole tool of claim 1, further comprising a plurality of pads, wherein each of the pads is coupled to the tool mandrel by one or more extensions, wherein each of the pads comprises a transmitter and a receiver.

12. The downhole tool of claim 1, wherein the downhole tool is operable to transmit the electric current into the formation at a high frequency of from about 10 kHz to about 1 GHz.

13. A downhole tool, comprising:
   a tool mandrel;
   a pad comprising an array of injection electrodes and a pair of return electrodes, wherein each of the return electrodes are disposed on opposite sides of the array from one another;
   an arm that couples the pad to the tool mandrel, wherein the arm is extendable from the tool mandrel;
   a ferrite sleeve disposed on the arm; and
   a signal filter positioned in the downhole tool to suppress passage of a leak current that passes first through the formation, through the tool mandrel, and then to the pad.

14. The downhole tool of claim 13, wherein the ferrite sleeve has a relative permeability of about 20 or greater.

15. The downhole tool of claim 13, wherein the ferrite sleeve is disposed completely around a diameter of the arm.

16. The downhole tool of claim 13, further comprising a plurality of pads, wherein each of the pads is coupled to the tool mandrel by one or more extensions, wherein each of the pads comprises a transmitter and a receiver.

17. A method of resistivity imaging, comprising:
   disposing a downhole tool into a borehole;
   transmitting a current into a formation surrounding the borehole with a transmitter that is extended from a tool mandrel of the downhole tool towards a borehole wall; and
   recording at least a portion of the current that returns to a receiver of the downhole tool, wherein a signal filter positioned in the downhole tool to suppress passage of a leak current that passes first through the formation, through the tool mandrel, and then to a pad.

18. The method of claim 17, further comprising extending the pad from the downhole tool with an arm, wherein the transmitter transmits the current when the pad is in engagement with a mudcake formed on the borehole wall, wherein an oil- or synthetic-based drilling mud is disposed in the borehole, and wherein the formation has a resistivity from about 0.01 Ω-m to about 1 Ω-m.

19. The method of claim 18, wherein the signal filter is disposed on the arm or the tool mandrel, wherein the signal filter comprises a soft magnetic material having a relative permeability of about 20 or greater.

20. The method of claim 17, further comprising extending the pad from the downhole tool with an arm wherein the signal filter is in the form of a sleeve disposed on the arm.

* * * * *